United States Patent
Huang et al.

(10) Patent No.: US 7,936,133 B2
(45) Date of Patent: May 3, 2011

(54) CONVERTER CIRCUIT CAPABLE OF SELF-REACTIVATION AND RELATED DISPLAY DEVICE

(75) Inventors: Li-Ming Huang, Kao-Hsiung (TW); Chung-Jung Huang, Tao-Yuan Hsien (TW)

(73) Assignee: Qiada Corporation, Taoyuan County (TW)

( * ) Notice: Subject to any disclaimer, the term of this patent is extended or adjusted under 35 U.S.C. 154(b) by 421 days.

(21) Appl. No.: 12/209,216

(22) Filed: Sep. 12, 2008

(65) Prior Publication Data

US 2009/0072756 A1   Mar. 19, 2009

(30) Foreign Application Priority Data

Sep. 14, 2007  (TW) ................................ 96134413 A

(51) Int. Cl.
*H05B 37/02* (2006.01)
(52) U.S. Cl. ..................................... 315/291; 315/209 R
(58) Field of Classification Search ............... 315/169.3, 315/291, 209 R, 307, 224, 244
See application file for complete search history.

(56) References Cited

U.S. PATENT DOCUMENTS

| 6,359,391 | B1 * | 3/2002 | Li ................................... 315/291 |
| 6,930,898 | B2 * | 8/2005 | Jeon et al. ........................ 363/98 |
| 7,279,852 | B2 * | 10/2007 | Henry ............................ 315/291 |
| 7,456,581 | B2 * | 11/2008 | Lee et al. ....................... 315/219 |

* cited by examiner

*Primary Examiner* — Douglas W Owens
*Assistant Examiner* — Minh D A

(57) ABSTRACT

A converter circuit includes a detecting circuit, a PWM circuit, a control circuit, a switching circuit, and a power converting circuit. The detecting circuit generates a first or a second control signal based on the voltage level of a load. The PWM circuit outputs a power control signal when receiving the first control signal, or stops operations when receiving the second control signal. The control circuit outputs a backlight-off signal when receiving the second control signal, and outputs a backlight-on signal after outputting the backlight-off signal. The switching circuit stops operations when receiving the backlight-off signal, and reactivates the PWM circuit after receiving the backlight-on signal. The power converting circuit provides the voltage for driving the load based on the power control signal.

9 Claims, 3 Drawing Sheets

CONVERTER CIRCUIT CAPABLE OF SELF-REACTIVATION AND RELATED DISPLAY DEVICE

BACKGROUND OF THE INVENTION

1. Field of the Invention

The present invention relates to a converting circuit, and more particularly, a converting circuit capable of self-reactivation.

2. Description of the Prior Art

A converter circuit is capable of converting DC power into AC power, therefore it is often used for driving a light tube used as a light source in a display device. The converter circuit is capable of detecting whether the light tube is turned on successfully. If the light tube can't be turned on after a predetermined period of time, the protecting circuit will be initiated and then interrupts the operation of the converter circuit.

Please refer to FIG. 1. FIG. 1 is a diagram of a converter circuit 100 in a display device according to the prior art. The converter circuit 100 converts power inputted from a power source 12 to drive a light tube 11 used as a backlight source for a panel 16. The converter circuit 100 includes a power converting circuit 13, a detecting circuit 14, and a pulse width modulation (PWM) circuit 15. The power converting circuit 13 controlled by the PWM circuit 15 is used to convert the power inputted from the power source 12 into a "Vcc" voltage for turning on the light tube 11. The detecting circuit 14 is used to detect if the light tube 11 has been turned on and control the PWM circuit 15 correspondingly. If the light tube 11 has been turned on, the detecting circuit 14 will send a corresponding control signal "Sct" to the PWM circuit 15 to control the power converting circuit 13 to sustain a normal operation of the converter circuit 100. If the light tube 111 hasn't been turned on, the detecting circuit 14 will send a corresponding control signal "Sct" to the PWM circuit 15 to turn off the power converting circuit 13 thereby terminating the operation of the converter circuit 100.

In the converter circuit 100 of the prior art, if the light tube 111 can't be turned on in a predetermined period of time because of abnormal interferences, the PWM circuit 15 will be shut off, and the user has to switch off the power source 12 and then switch on the power source 12 manually to try to turn on the light tube 11, making operation highly undesirable.

SUMMARY OF THE INVENTION

The present invention relates to a converter circuit capable of self-reactivation comprises a detecting circuit, a pulse width modulation (PWM) circuit, a control circuit, a switching circuit, and a power converting circuit. The detecting circuit is for detecting a voltage level of a load and generating a first control signal or a second control signal correspondingly according to the voltage level. The pulse width modulation (PWM) circuit coupled to the detecting circuit is for outputting a power control signal when receiving the first control signal, or for stopping operations of the PWM circuit a first predetermined time period after receiving the second control signal. The control circuit coupled to the detecting circuit is for outputting a backlight-off signal a second predetermined time period after receiving the second control signal, and outputting a backlight-on signal a third predetermined time period after outputting the backlight-off signal. The switching circuit coupled to the PWM circuit and the control circuit is for stopping operations of the PWM circuit after receiving the backlight-off signal, and reactivating the PWM circuit after receiving the backlight-on signal. The power converting circuit coupled to the PWM circuit is for converting input power to provide converted power to the load based on the power control signal.

The present invention relates to a display device capable of self-reactivation comprises a panel, a light source disposed at one side of the panel, a power source for generating power, and a converter circuit. The converter circuit comprises a detecting circuit, a pulse width modulation (PWM) circuit, a control circuit, a switching circuit, and a power converting circuit. The detecting circuit is for detecting a voltage level of the light source and generating a first control signal or a second control signal correspondingly according to the voltage level. The pulse width modulation (PWM) circuit coupled to the detecting circuit is for outputting a power control signal when receiving the first control signal, or for stopping operations of the PWM circuit a first predetermined time period after receiving the second control signal. The control circuit coupled to the detecting circuit is for outputting a backlight-off signal a second predetermined time period after receiving the second control signal, and outputting a backlight-on signal a third predetermined time period after outputting the backlight-off signal. The switching circuit coupled to the PWM circuit and the control circuit is for stopping operations of the PWM circuit after receiving the backlight-off signal, and reactivating the PWM circuit after receiving the backlight-on signal. The power converting circuit coupled to the PWM circuit is for converting to the power generated by the power source to provide converted power to the light source based on the power control signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
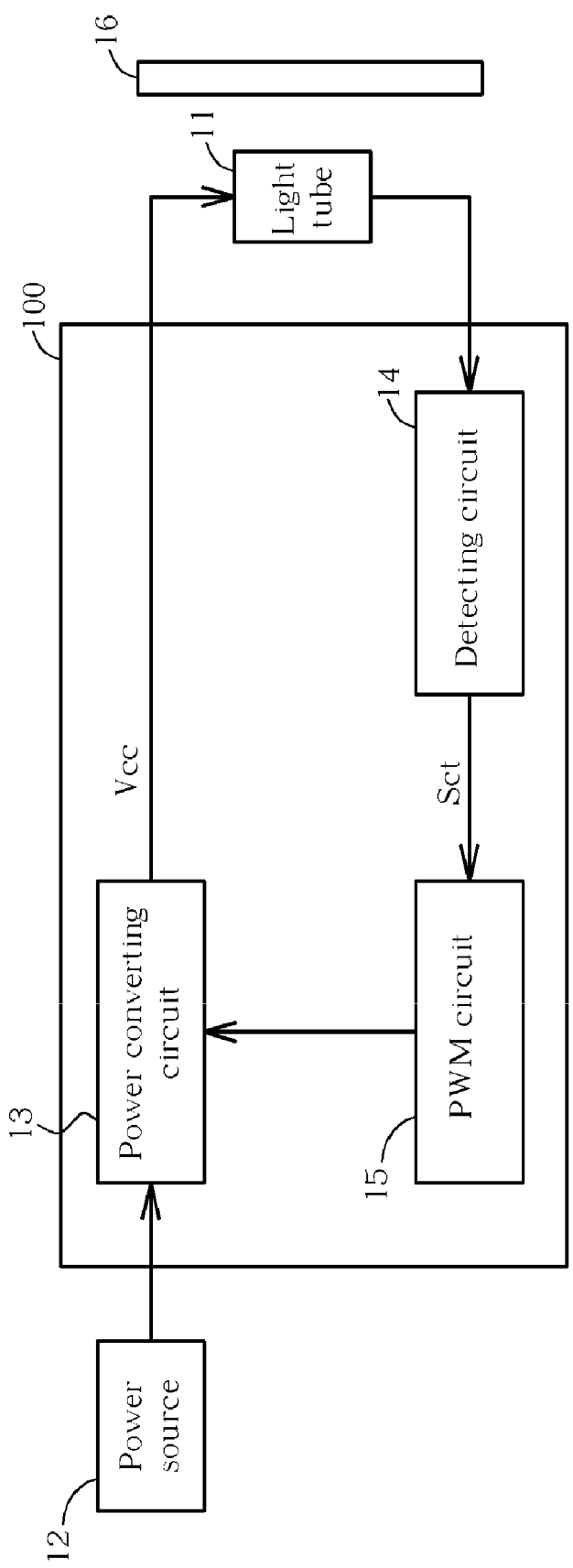
FIG. 1 is a diagram of a converter circuit in a display device according to the prior art.
Figure 2:
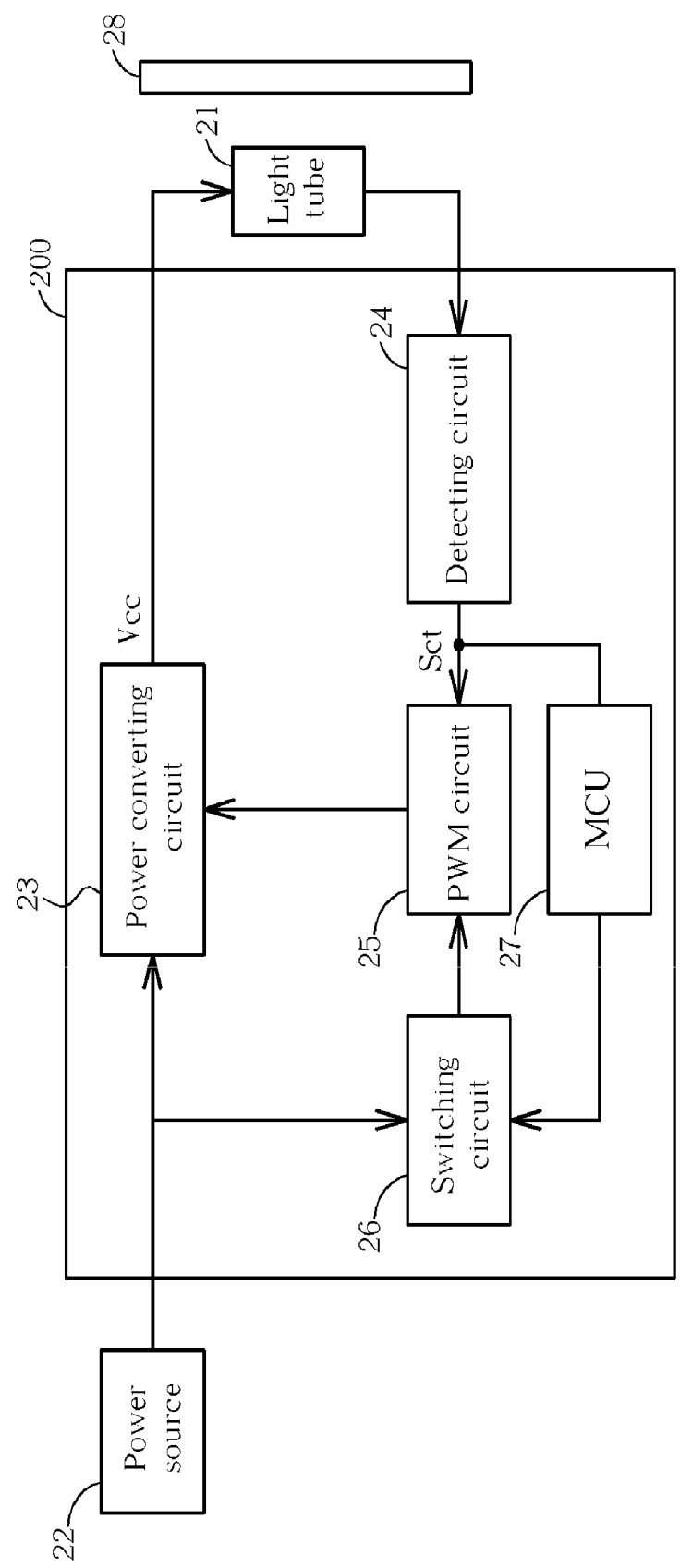
FIG. 2 is a block diagram of a converter circuit in a display device according to the present invention.

Please refer to FIG. 2. FIG. 2 is a block diagram of a converter circuit 200 in a display device according to the present invention. The converter circuit 200 converts power inputted from a power source 22 to drive a light tube 21 used as a backlight source for a panel 28. The converter circuit 200 includes a power converting circuit 23, a detecting circuit 24, a pulse width modulation (PWM) circuit 25, a switching circuit 26, and a microcontroller unit (MCU) 27. The power converting circuit 23 controlled by the PWM circuit 25 is used to convert the power inputted from the power source 22 into a "Vcc" voltage for turning on the light tube 21. The detecting circuit 24 is used to detect if the light tube 21 has been turned on and controls the PWM circuit 25 correspondingly. If the light tube 21 has been turned on, the detecting circuit 24 will send a corresponding control signal "Sct" to the PWM circuit 25 to control the power converting circuit 23 to sustain a normal operation of the converter circuit 200. If the light tube 21 hasn't been turned on, the detecting circuit 24 will send a corresponding control signal "Sct" to the PWM circuit 25 and the MCU 27. After receiving the control signal "Sct" transmitted from the detecting circuit 24, the PWM circuit 25 will turn off the power converting circuit 23 thereby terminating the operation of the converter circuit 200, and the microcontroller 27 will send a backlight-off signal to shut off the switching circuit 26 simultaneously. After a predetermined period of time, the MCU 27 will send out a backlight-on signal to switch on the switching circuit 26 to restart the PWM circuit 25 and tries to turn on the light tube 21 again. If the light tube 21 can't be turned on after trying a predetermined number of times, the MCU 27 will no more send out the backlight-on signals.

Figure 3:
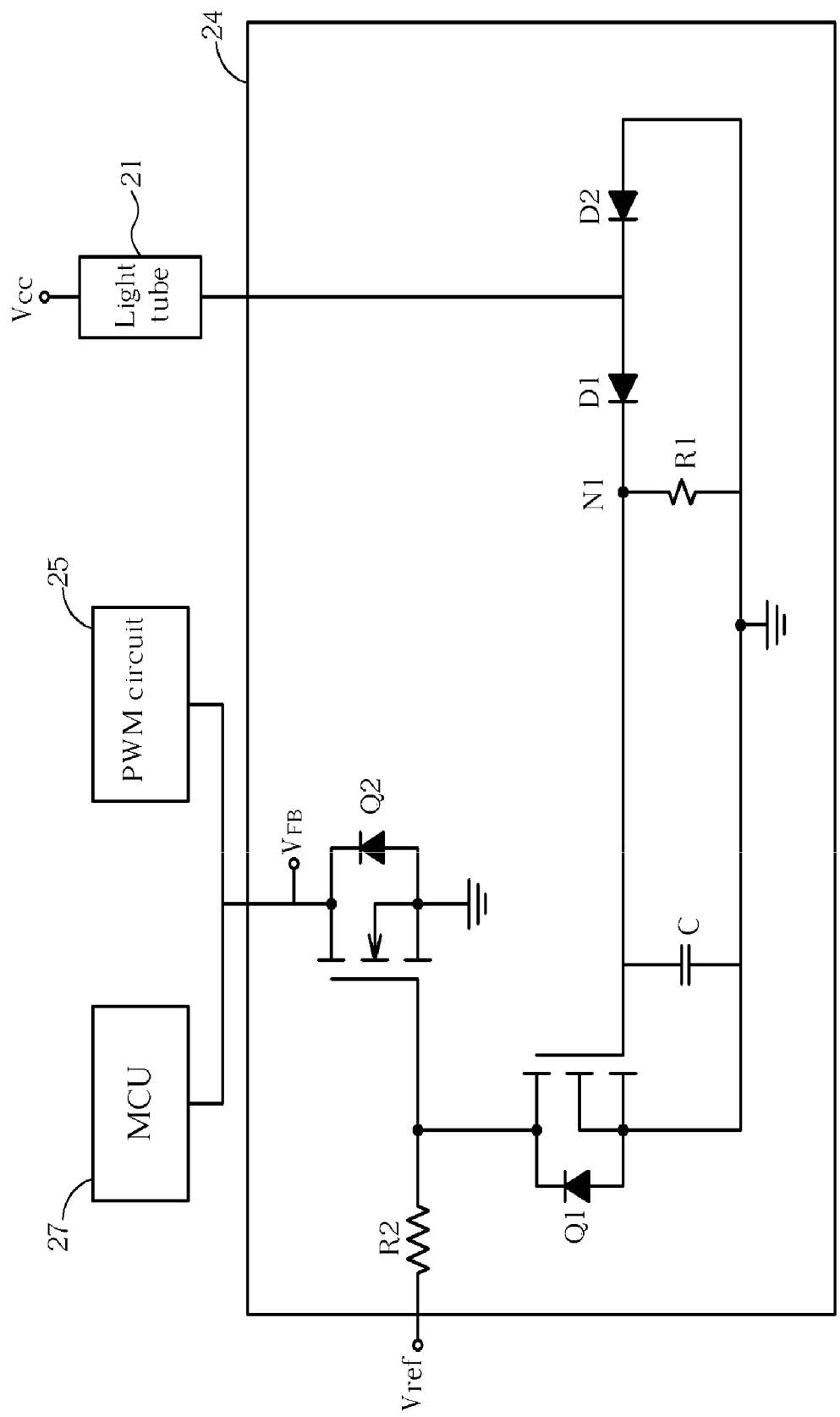
FIG. 3 is a schematic diagram of a detecting circuit according to an embodiment of the present invention.

Please refer to FIG. 3. FIG. 3 is a schematic diagram of the detecting circuit 24 according to an embodiment of the present invention. According to the embodiment in FIG. 3, the input end of the detecting circuit 24 is coupled to the light tube 21, and the output end of the detecting circuit 24 is coupled to the PWM circuit 25 and the MCU 27. The detecting circuit 24 includes transistors Q1 and Q2, diodes D1 and D2, resistors R1 and R2, and a capacitor C and so on. When the light tube 21 receives the voltage "Vcc" and is turned on successfully, the light tube 21 will produce a predetermined current. After the predetermined current passes through the diode D1, a voltage will be generated at node N1 through the resistor R1. At this moment the voltage at the gate of the transistor Q1 becomes sufficiently high to switch on the transistor Q1, and the voltage difference generated by the inputted reference voltage "Vref" and the resistor R2 at the gate of the transistor Q2 will be drawn back to zero after the transistor Q1 is switched on, therefore the transistor Q2 becomes switched-off. In such a situation, the detecting circuit 24 can pass the high voltage of the feedback signal $S_{FB}$ to the PWM circuit 25.

On the other hand, when the light tube 21 receives the voltage "Vcc" and is not able to be turned on by Vcc, no current will flow through the light tube 21, hence the predetermined voltage won't be generated at node N1. Thus the voltage at the gate of the transistor Q1 remains low, and the transistor Q1 remains off at this time. Simultaneously, the inputted reference voltage "Vref" switches on the transistor Q2 through the resistor R2, and the voltage at the input end of the detecting circuit 24 will be drawn back to zero after the transistor Q2 is switched on. Therefore, under this situation, the detecting circuit 24 cannot pass the feedback signal $S_{FB}$ to the PWM circuit 25.

Accordingly, in the display device of the present invention, if the light tube 21 can't be turned on at the first time because of abnormal interferences, the light tube 21 may have a second chance or a third chance to be turned on rather than be inactivated by the protecting circuit of the light tube 21 right after the first failure. Thus the user doesn't need to turn off the power source 22 and then turn on the power source 22 manually to try to turn on the light tube 21.

Those skilled in the art will readily observe that numerous modifications and alterations of the device and method may be made while retaining the teachings of the invention.

What is claimed is:

1. A converter circuit capable of self-reactivation comprising:
   a detecting circuit for detecting a voltage level of a load and generating a first control signal or a second control signal correspondingly according to the voltage level;
   a pulse width modulation (PWM) circuit coupled to the detecting circuit for outputting a power control signal when receiving the first control signal, or for stopping operations of the PWM circuit a first predetermined time period after receiving the second control signal;
   a control circuit coupled to the detecting circuit for outputting a backlight-off signal a second predetermined time period after receiving the second control signal, and outputting a backlight-on signal a third predetermined time period after outputting the backlight-off signal;
   a switching circuit coupled to the PWM circuit and the control circuit for stopping operations of the PWM circuit after receiving the backlight-off signal, and reactivating the PWM circuit after receiving the backlight-on signal; and
   a power converting circuit coupled to the PWM circuit for converting input power to provide converted power to the load based on the power control signal.

2. The converter circuit of claim 1 wherein the control circuit is a microcontroller unit (MCU).

3. The converter circuit of claim 1 wherein the detecting circuit comprises a transistor, diode, resistor, and capacitor.

4. The converter circuit of claim 1 wherein the first control signal is a high voltage and the second control signal is a low voltage.

5. A display device capable of self-reactivation comprising:
   a panel;
   a light source disposed at one side of the panel;
   a power source for generating power; and
   a converter circuit comprising:
      a detecting circuit for detecting a voltage level of the light source and generating a first control signal or a second control signal correspondingly according to the voltage level;
      a pulse width modulation (PWM) circuit coupled to the detecting circuit for outputting a power control signal when receiving the first control signal, or for stopping operations of the PWM circuit a first predetermined time period after receiving the second control signal;
      a control circuit coupled to the detecting circuit for outputting a backlight-off signal a second predetermined time period after receiving the second control signal, and outputting a backlight-on signal a third predetermined time period after outputting the backlight-off signal;
      a switching circuit coupled to the PWM circuit and the control circuit for stopping operations of the PWM circuit after receiving the backlight-off signal, and reactivating the PWM circuit after receiving the backlight-on signal; and
      a power converting circuit coupled to the PWM circuit for converting to the power generated by the power source to provide converted power to the light source based on the power control signal.

6. The display device of claim 5 wherein the control circuit is a microcontroller unit (MCU).

7. The display device of claim 5 wherein the detecting circuit comprises a transistor, diode, resistor, and capacitor.

8. The display device of claim 5 wherein the first control signal is a high voltage and the second control signal is a low voltage.

9. The display device of claim 5 wherein the light source is a light tube.

* * * * *